(12) United States Patent
Lesperance

(10) Patent No.: US 11,857,100 B2
(45) Date of Patent: Jan. 2, 2024

(54) FOOD ELEVATING PLATFORM

(71) Applicant: Jeffery Baron Lesperance, Howell, MI (US)

(72) Inventor: Jeffery Baron Lesperance, Howell, MI (US)

(*) Notice: Subject to any disclaimer, the term of this patent is extended or adjusted under 35 U.S.C. 154(b) by 0 days.

(21) Appl. No.: 17/868,025

(22) Filed: Jul. 19, 2022

(65) Prior Publication Data
US 2023/0020341 A1   Jan. 19, 2023

Related U.S. Application Data

(60) Provisional application No. 63/223,199, filed on Jul. 19, 2021.

(51) Int. Cl.
*A47G 19/22* (2006.01)
*A47J 19/00* (2006.01)
*B65D 81/26* (2006.01)

(52) U.S. Cl.
CPC .......... *A47J 19/005* (2013.01); *B65D 81/262* (2013.01)

(58) Field of Classification Search
CPC ........ B65D 51/24; B65D 81/262; A47J 36/20; A47J 43/284; A47J 43/24; A47J 47/00; A47J 2037/0795; A47G 19/2211; A47G 19/02; A47G 19/30; A47G 19/005; A47G 23/00; A47G 23/0683
USPC ..................... 220/719, 574, 713, 23.87, 554
See application file for complete search history.

(56) References Cited

U.S. PATENT DOCUMENTS

| | | | | |
|---|---|---|---|---|
| 3,549,044 | A | * | 12/1970 | Lerner ............... A47G 19/2211 220/719 |
| 2008/0302718 | A1 | * | 12/2008 | Hardy ............... A47G 19/2211 210/477 |
| 2014/0183203 | A1 | * | 7/2014 | Curtis ..................... A47J 43/24 220/694 |

* cited by examiner

*Primary Examiner* — King M Chu
(74) *Attorney, Agent, or Firm* — The Patent Baron, PLLC

(57) ABSTRACT

The disclosure provides a food elevating platform with adjustable elements to selectively engage the walls of a container. The food elevating platform includes a mesh screen to allow liquids from food to pass through and collect in the bottom of the container. The food elevating platform includes one or more engaging surfaces about the edge of the platform that also may engage the surface of the container. One or more logos and/or text may be incorporated into the food elevating platform and/or its components.

6 Claims, 4 Drawing Sheets

FOOD ELEVATING PLATFORM

CROSS-REFERENCE TO RELATED APPLICATIONS

This application claims priority benefit of U.S. Provisional Application No. 63/223,199 filed on Jul. 19, 2021, the entire contents and disclosures of which is/are incorporated herein by reference.

BACKGROUND

1. Field of the Disclosure

This disclosure is directed to a food platform and other devices for elevating food above liquids. The disclosure is also directed to an adjustable food elevating platform for use in food containers to elevate food above liquids.

2. Description of the Background

Food is often stored in containers. These containers typically are sealed at the bottom. That is, they are watertight. For example, food containers may be constructed of plastic, glass, metal, ceramic, and other suitable materials. As a result, any liquids that are part of the food tend to accumulate in the bottoms of these containers, due in large part to the effects of gravity.

Often food contains a large percentage of water or other fluids. In other cases, fluids are added to the food. In either case, fluids are a part of food but are not necessarily always desirable.

For example, salads typically contain a variety of vegetables and other ingredients. Some of these ingredients contain a lot of water, such as tomatoes and cucumbers. Once these items are cut in particular, water tends to leave the tomatoes and cucumbers and come into contact with other salad ingredients before accumulating in the bottom of the container or bowl.

Additionally, it is common to add other liquid ingredients to salads to improve or enhance (or mask) their flavors. These liquids include, for example, oil, vinegar, or salad dressings such as ranch or Italian dressing. While these liquids ("dressings") are desirable, they can have a negative effect on the salad—sogginess. Often it is our fault. We tend to add too much dressing to the salad and by the time we have consumed enough of the salad to reach the bottom of the container we are greeted by a pool of soggy and unappealing vegetables. As a result, these vegetables are often left uneaten and discarded, along with the extra dressing. This is wasteful and can be easily avoided.

In other situations, such as in food preparation, sogginess is also an undesirable situation. For example, cutting cucumbers and storing them in a bowl. As the bowl is being filled with cut cucumbers, water leaving the cucumbers slowly moves downward over earlier-cut cucumbers and settled in the bottom of the bowl. This is a particularly distressing for the unfortunate cucumber slices at the bottom of the bowl as they are "drowning" in cucumber water. As a result, these cucumbers in particular may be discarded before even making it to the intended dish, causing more wasted food.

What is needed then is a food elevating platform for use in containers and bowls that elevates food above the accumulation of water and other liquids in the container.

SUMMARY

The present disclosure overcomes the problems and disadvantages associated with current strategies and designs and provides new tools and methods for a food elevating platform.

One embodiment of the disclosure is directed to a food elevating platform that includes openings for liquids to pass through to the bottom of a container.

Another embodiment of the disclosure is directed to a food elevating platform that includes at least one adjustable element to engage a side of the container.

Another embodiment of the disclosure is directed to a food elevating platform that includes at least one separately adjustable element to engage a side of the container.

Another embodiment of the disclosure is directed to a food elevating platform that engages a container at different locations using the at least one separately adjustable element.

Another embodiment of the disclosure is directed to a food elevating platform that includes frictional elements for selectively engaging sides of a container.

Another embodiment of the disclosure is directed to a food elevating platform that includes at least one locking mechanism.

Another embodiment of the disclosure is directed to a food elevating platform that is constructed of materials that are food-safe.

Another embodiment of the disclosure is directed to a food elevating platform that is constructed of materials that are dishwasher safe.

Another embodiment of the disclosure is directed to a food elevating platform that includes at least one portion for a logo, pattern, or other design.

Another embodiment of the disclosure is directed to a food elevating platform that includes at least one support to engage the bottom of a container.

Another embodiment of the disclosure is directed to a food elevating platform that includes a frame, a mesh screen disposed within the frame, where the frame includes in inner portion configured to receive the mesh screen and an outer portion configured to engage a first surface of a container, where the frame and mesh screen elevate objects a predetermined distance above a second surface of a container.

Another embodiment of the disclosure is directed to a food elevating platform that includes at least one selectively adjustable wing, where the at least one selectively adjustable wing is secured to at least one of the frame and the mesh screen with a pin.

Another embodiment of the disclosure is directed to a food elevating platform that includes a pin includes a selectively rotational device.

Another embodiment of the disclosure is directed to a food elevating platform that includes a second frame forming a slot to receive the at least one selectively adjustable wing wherein the at least one selectively adjustable wing is secured to at least one of the first frame, second frame, and the mesh screen with a pin.

Another embodiment of the disclosure is directed to a food elevating platform that includes a second frame including a second mesh screen.

Another embodiment of the disclosure is directed to a food elevating platform that includes a pin that includes a selectively rotational device.

Another embodiment of the disclosure is directed to a food elevating platform that includes a mesh screen includes at least one logo.

Another embodiment of the disclosure is directed to a food elevating platform that includes at least one selectively adjustable wing including a frictional element to selectively engage at least one surface of the container.

Other embodiments and advantages of the disclosure are set forth in part in the description, which follows, and in part, may be obvious from this description, or may be learned from the practice of the disclosure.

DESCRIPTION OF THE FIGURES

The disclosure is described in greater detail by way of example only and with reference to the attached drawings, in which.

DESCRIPTION OF THE DISCLOSURE

Figure 1:
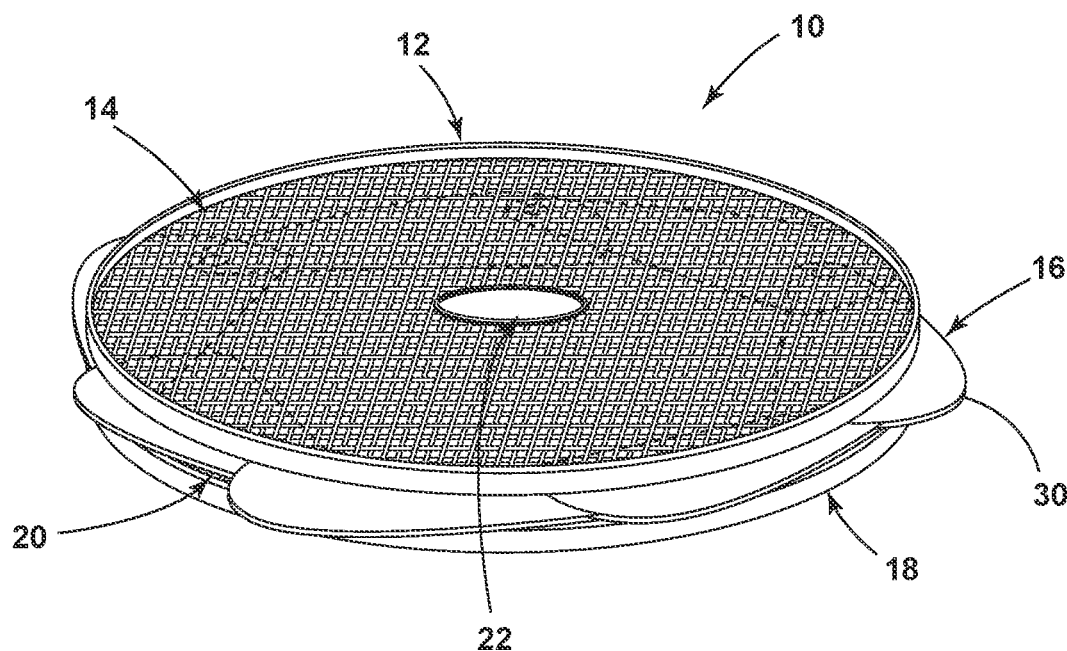
FIG. 1 is a perspective view of an embodiment of the present disclosure.
Figure 2:
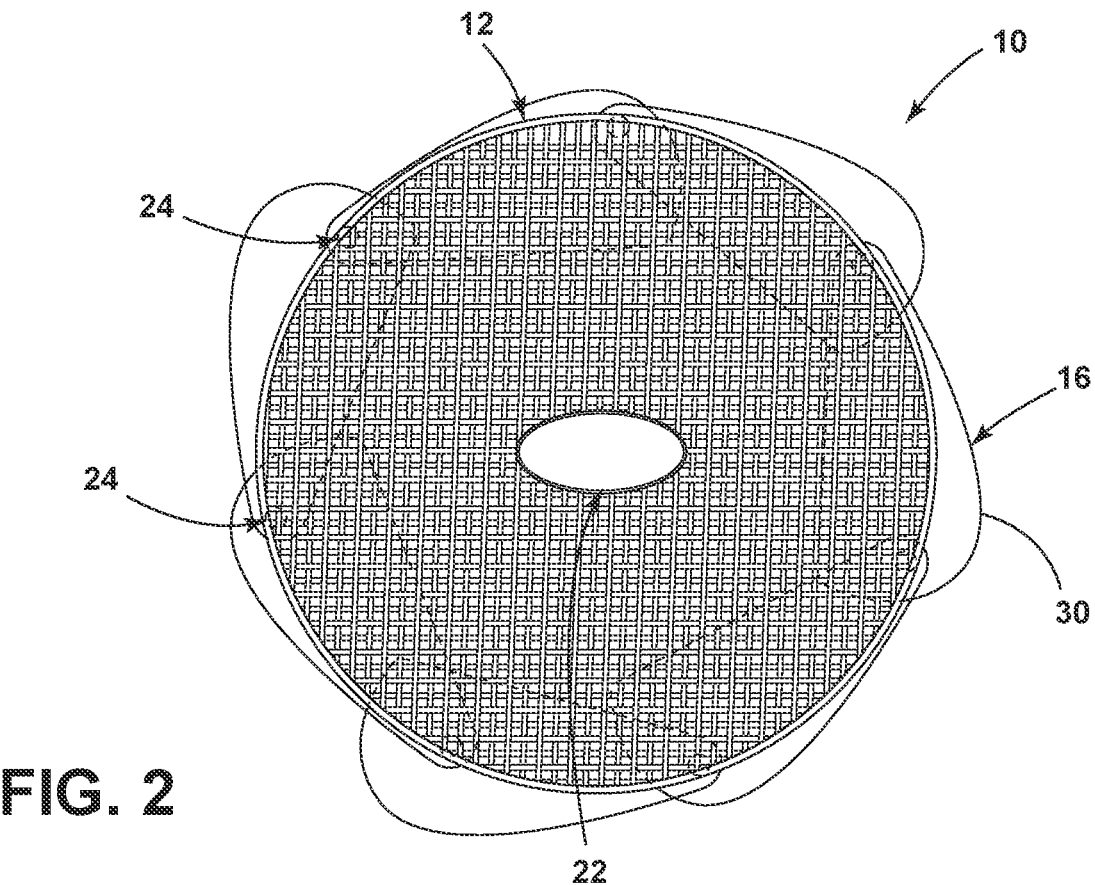
FIG. 2 is a top view of an embodiment of the present disclosure.

As embodied and broadly described herein in the Figures, the present disclosure is directed to food elevating platform ("platform") 10.

According to one embodiment of the disclosure, platform 10 may be in the form suitable for use in a food container (e.g., bowl, see FIG. 3) or a food preparation container, such as a cooking pot. Additional embodiments may be suitable for use in beverage containers, coolers (e.g., ice chests), or other situations where it is desirable to separate food and/or beverages from other items, not necessarily only by the effect of gravity.

Platform 10 includes first frame 12 that surrounds a mesh screen 14. It should be understood that while the drawings illustrate a circular embodiment of the present disclosure, these drawings are for exemplary purposes only. Platform 10 may be realized in other shapes and/or configurations, such as but not limited to shapes such as ovals, rectangles, squares, or any other configuration to engage a container.

First frame 12 may include support structure for one or more wings 16. Wings 16 may be configured to extend from a stowed position within platform 10 to selectively engage one or more surfaces of a container such as bowl 26 (see FIG. 3). Wings 16 may overlap one another, or at least partially, and allow for engagement of different shapes of containers. Additionally, the wings 16 may be configured to move together as a unit or separately to provide additional flexibility in engaging the surfaces of a container such as bowl 26. Further, wings 16 allow for the positioning of platform 10 at different levels within a container. For example, if all of the wings 16 are stowed within platform 10 via slot 20, then the dimensions of first frame 12 and second frame 18 dictate the position of platform 10 when placed in a particular container, depending upon its shape. However, if one desires to place platform 10 at a different (e.g., higher) level within the particular container, extending one or more of the wings 16 effectively and selectively increase the dimensions of platform 10, resulting in platform 10 engaging a different portion of the wall of the particular container (in the case of a sloping wall container, for example).

Wings 16 may include one or more edges 30. Edges 30 may be configured with frictional material to selectively engage a surface, such as side 28 or bowl 26. Edges 30 may be molded into wings 16 or as separate components selectively attached to wings 16. In embodiments, edges 30 may be removable and/or replaceable.

This adjustability may be desirable for a number of situations. One such situation is that of a traditional vegetable salad. Typically, vegetable salads include a number of different vegetables including lettuce, tomatoes, cucumbers, olives, and onions. Most salads are also topped with some sort of liquid dressing, for example, wine and vinegar, ranch dressing, Italian dressing, and French dressing. Often the amount of dressing applied to the salad is excessive, either intentionally or accidentally. Due to gravity, the dressing flows over the vegetables and collects at the bottom of the container or bowl. Any vegetables at the bottom of the bowl end up soaked in dressing to the point of becoming soggy and unappetizing. Typically, those eating salads start from the top of the bowl and so only reach the vegetables at the bottom of the bowl last, after they have spent some time soaking in dressing and becoming soggy. Thus, those vegetables are often not eaten and are wasted. Using platform 10 to elevate the vegetables of the salad from the collected dressing at the bottom of the bowl 16 prevents this occurrence and therefore eliminates the soggy vegetable situation.

Another situation is that of storing vegetables, fruits, and meats, particularly those precut before storage. While some specialized containers exist for storing these items, these specialized containers do not allow for the use of one's existing bowls and containers and necessitate acquiring these containers. In addition, these containers often are of limited size and volume capacity, which may be undesirable.

For example, cut fruit, such as strawberries, can cause water and juice of the strawberries to come to the cut surfaces. These liquids then cause the fruits to become soggy, particularly those fruits at the bottom of a bowl or container as the liquids accumulate from all of the cut fruit in the container. Thus, platform 10, when used with the container, allows liquids from the cut fruits to drain beneath the lowest cut fruits and prevent the fruits from becoming soggy.

Yet another situation is that of a fruit punch. Typically, fruit punch is made with water, sugar, flavoring, and a variety of fruits, as well as ice to keep the fruit punch chilled. However, those consuming the fruit punch tend to not want to have ice and/or fruit in their glass of fruit punch. As the fruit punch is collected either by dipping a glass in the punch bowl or using a ladle, ice and/or fruit can easily end up in either the glass or ladle. However, using platform 10 in the bottom portion of a punch bowl, ice and/or fruit can be trapped beneath platform 10, leaving the remaining liquid in the punch bowl to be chilled by the ice and flavored by the fruit without having either end up in a glass or ladle of punch.

Another situation is that of food preparation, in particular cooking a number of ingredients that result in the accumulation of undesired liquids. For example, cooking ground beef, such as for tacos, tends to produce some liquids that include fat, grease, or other liquids. These liquids may be undesirable in the finished product (taco) as they may cause the taco shell to become soggy and structurally unsound. Using platform 10 in a container, placing the cooked ground beef into the container and onto platform 10 allows the unwanted liquids to drain through and beneath platform 10. The drained ground beef can thus be used in tacos without the messy liquids damaging the taco shells.

Another situation is that of marinating a food product, such as chicken. While it is desirable to expose chicken to be cooked in a marinade (a liquid containing spices, seasonings, and other ingredients) often it is not desirable to allow some of the chicken (or other food product) to be submerged in the marinate while other portions are allowed to dry. Using platform 10, marinade can run over the chicken be collected in the bowl beneath platform 10. If the bowl is covered, such as using a lid, plastic film, or other product, shaking the container can redistribute the marinade on the chicken and then allow it to resettle beneath platform 10 due to gravity.

Yet another situation in which platform 10 is desirable is that of cereal. Cereal, commonly known as breakfast cereal but often consumed at all times of the day, is typically done by first pouring cereal into a bowl or container and then pouring milk or a milk substitute over the cereal to a desired level. Often, this level is overestimated. As a result, the cereal becomes soggy as the consumer reaches the lower levels of the bowl. While some people enjoy soggy cereal, others do not. The platform 10 can be used to elevate cereal above or near the milk line in the bowl, to the consumer's preference, by setting of the wings 16. The consumer may then retract one of more of the wings 16 by using a spoon, for example, causing the platform 10 to descend in the bowl, exposing the remaining cereal to milk once again, maintaining its original characteristics.

Wings 16 may articulate using one or more pivot points, hinges, or pins 24. It should be understood that pins 24 are only an exemplary device to allow for the movement of wings 16 in platform 10 and that other devices to enable the movement of wings 16 (either as a group or separate from one another is contemplated). Wings 16 allow for platform 10 to engage varied surfaces of bowl 26. For example, for an oval bowl, extending some of wings 16 allows for platform 10 to selectively engage the bowl 26 and prevent most of the ingredients stored within from falling beneath platform 10. It should also be understood that while a small number of wings 16 are illustrated in the Figures, it is contemplated that fewer or more wings 16 may be incorporated in platform 10 in order to engage bowl 26.

A second frame 18 may be included in platform 10. The pins 24 may, in certain embodiments, extend from first wing 12 through wings 16 to second frame 18. First frame 12 and/or second frame 18 may engage a surface of bowl 26. For example, in some situations, the shape of bowl 26 may engage with platform 10 at first level, leaving a first distance beneath platform 10 to the bottom of bowl 26. This first distance may be sufficient for one salad with dressing for one individual. However, a second individual may like more dressing in their salad so they may extend one or more wings 16 to position platform 10 at a second distance (higher than the first distance) above the bottom of bowl 26 due to their experience in adding more (or too much) dressing). This situation presumes that bowl 26 has a curved or tapered interior surface as many containers do not feature vertical sides. It should be understood that additional frames may be included in the platform 10, and the first frame 12 and second frame 18 is only exemplary and not limiting.

First frame 12 and second frame 18 may include a mesh screen 14. Mesh screen 14 may be integrated or selectively attachable or removable from frames 12 and 18. Mesh screen 14 is configured to separate liquids from solids, such as salad dressing from vegetables, or other examples as contemplated or discussed herein. Mesh screen 14 may be configured in a variety of profiles and may depend on the scale and usage of platform 10.

Platform 10 may include a portion for a logo 22. As shown in the Figures, logo 22 may be positioned at the center of platform 10, but other locations (or multiple locations) are contemplated. For example, logo 22 may include the name of the platform or its producer. Additionally, other logos may include that of a restaurant, sports team, or other logo. It is understood that logo 22 may include a design and/or text. Logo 22 may be customizable as well. In embodiments, logo 22 may be replaceable and/or interchangeable.

Figure 3:
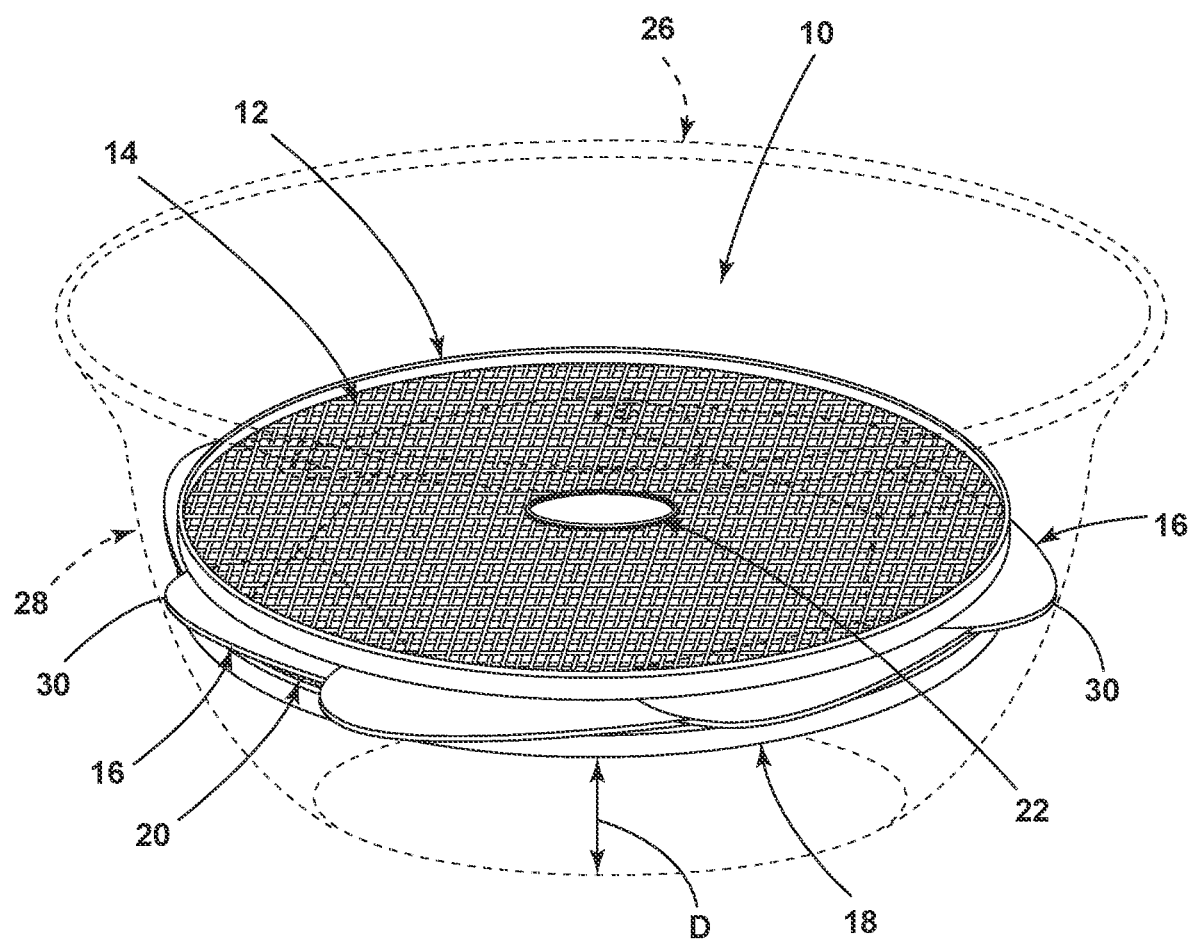
FIG. 3 is a perspective view of an embodiment of the present disclosure.

FIG. 3 illustrates one embodiment of platform 10 used in bowl 26. Bowl 26 includes at least one side 28 that extends around the perimeter of the bowl 26 and includes an exterior surface and an interior surface. In this illustration, wings 16 are shown engaging the interior surface of side 28, positioning the platform 10 a distance D above the bottom of the interior of the bowl 26. In other situations, one or both of first frame 12 and second frame 18 may also engage that surface, which case the wings 16 may remain stowed within platform 10 and provide a different distance D. In other situations, such as where it is desired that distance D be greater, some or all of wings 16 may be extended, effectively increasing the dimension of platform 10.

Figure 4:
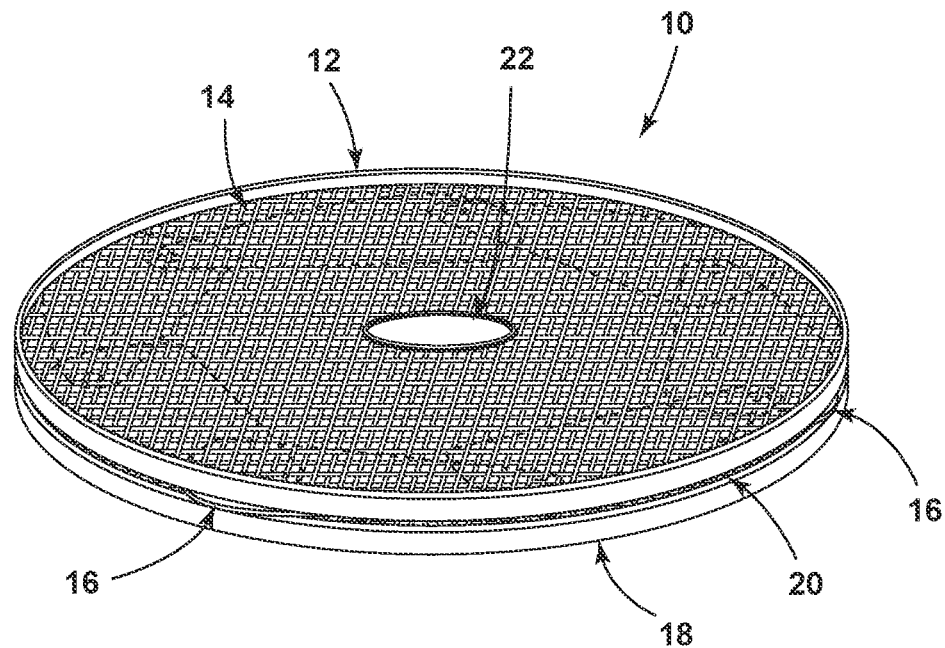
FIG. 4 is a perspective view of an embodiment of the present disclosure.

FIG. 4 illustrates one embodiment of platform 10. Platform 10 is shown with wings 16 retracted within slot 20 of platform 10. Wings 16 may be stowed for at least several reasons, such as for storage when not in use, or when the wings-stowed size of platform 10 is desired. Frame 12 and frame 18 of platform 10 may be configured to include a frictional surface, such as used in some embodiments on wings 16, to selectively engage a side 28 of bowl 26. The frictional surface, which may include a coating or a sub-component of platform 10, selectively engages side 28 to maintain position, while supporting a load such as various food items.

Figure 5:
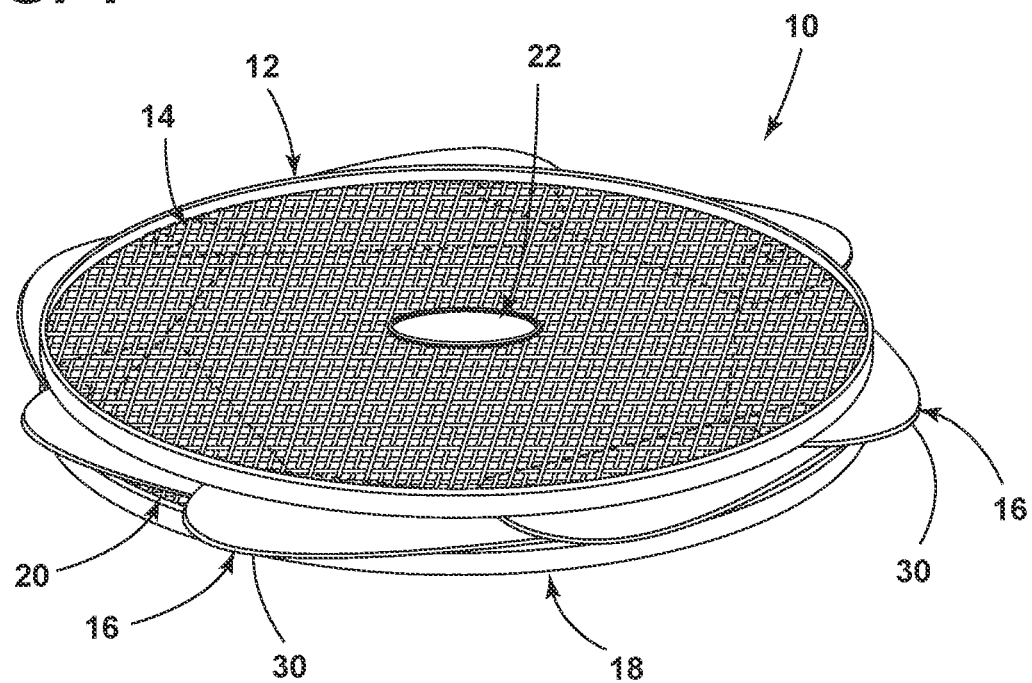
FIG. 5 is a perspective view of an embodiment of the present disclosure.

FIG. 5 illustrates one embodiment of platform 10. Platform 10 is shown with some or all of wings 16 at least partially extended via slot 20 by pins 24. Pins 24 may include elements and/or components to restrict or otherwise selectively control rotational movement. For example, pins 24 may rotate and lock in various rotational positions. Pins 24 may rotate and ratchet-lock in position at various stages from stowed to fully extended. In order for wings 16 to be stowed, in some embodiments, wings 16 may need to be fully extended first, upon which the ratchet mechanism of pins 24 may disengage and wings 16 may be fully stowed via slot 20 in platform 20. In other embodiments, pins 24 may include other elements or devices, such as but not limited to, springs and frictional elements.

Figure 6:
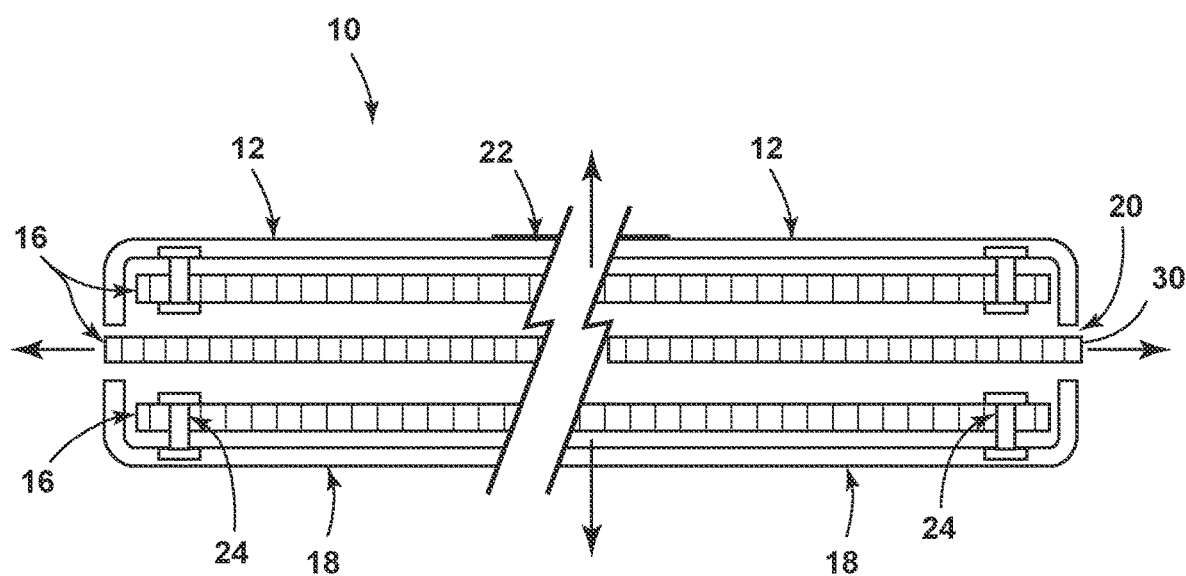
FIG. 6 is a partial cutaway view of an embodiment of the present disclosure.

FIG. 6 illustrates a partial cutaway or cross-sectional view of one embodiment of platform 10. First frame 12 and second frame 18 are shown and may include mesh screen 14. Wings 16 with edges 30 are shown stowed in slot 20 of platform 10. Pins 24 extend through wings 16 and are secured to frames 12 and 18. Logo 22 is disposed on at least a surface of frame 12, though additional logos 22 on frames 12 and/or 18 are contemplated.

Platform 10 and its components described herein may be constructed of a variety of materials. These materials may be those that can withstand a range of temperatures from extreme cold to extreme heat (such as those used to cook food). These materials may also be those that are considered (or will be considered) to be food-safe. Additionally, it is contemplated that platform 10 and its components are washable and "dishwasher-safe" to allow for ease in cleaning.

Some of the materials contemplated for use in platform 10 and its components include but are not limited to, plastics, polymers, metal, and silicone.

The preceding examples illustrate embodiments of the disclosure, but should not be viewed as limiting the scope of the disclosure.

Other embodiments and uses of the disclosure will be apparent to those skilled in the art from consideration of the specification and practice of the disclosure disclosed herein. All references cited herein, including all publications, U.S. and foreign patents and patent applications, are specifically and entirely incorporated by reference. The term comprising, where ever used, is intended to include the terms consisting and consisting essentially of. Furthermore, the terms comprising, including, and containing are not intended to be limiting. It is intended that the specification and examples be considered exemplary only with the true scope and spirit of the disclosure indicated by the following claims.

The invention claimed is:

1. A platform comprising:
a frame;
a mesh screen disposed within the frame;
wherein the frame includes in inner portion configured to receive the mesh screen and an outer portion configured to engage a first surface of a container,
wherein the frame and mesh screen elevate objects a predetermined distance above a second surface of a container, further comprising at least one selectively adjustable wing, wherein the at least one selectively adjustable wing is secured to at least one of the frame and the mesh screen with a pin.

2. A platform comprising:
a frame;
a mesh screen disposed within the frame;
wherein the frame includes in inner portion configured to receive the mesh screen and an outer portion configured to engage a first surface of a container,
wherein the frame and mesh screen elevate objects a predetermined distance above a second surface of a container, further comprising at least one selectively adjustable wing, wherein the at least one selectively adjustable wing is secured to at least one of the frame and the mesh screen with a pin, wherein the pin includes a selectively rotational device.

3. A platform comprising:
a frame;
a mesh screen disposed within the frame;
wherein the frame includes in inner portion configured to receive the mesh screen and an outer portion configured to engage a first surface of a container,
wherein the frame and mesh screen elevate objects a predetermined distance above a second surface of a container, further comprising at least one selectively adjustable wing, wherein the at least one selectively adjustable wing is secured to at least one of the frame and the mesh screen with a pin, further comprising a second frame forming a slot to receive the at least one selectively adjustable wing wherein the at least one selectively adjustable wing is secured to at least one of the first frame, second frame, and the mesh screen with a pin.

4. A platform comprising:
a frame;
a mesh screen disposed within the frame;
wherein the frame includes in inner portion configured to receive the mesh screen and an outer portion configured to engage a first surface of a container,
wherein the frame and mesh screen elevate objects a predetermined distance above a second surface of a container, further comprising at least one selectively adjustable wing, wherein the at least one selectively adjustable wing is secured to at least one of the frame and the mesh screen with a pin, further comprising a second frame forming a slot to receive the at least one selectively adjustable wing wherein the at least one selectively adjustable wing is secured to at least one of the first frame, second frame, and the mesh screen with a pin, wherein the second frame includes a second mesh screen.

5. A platform comprising:
a frame;
a mesh screen disposed within the frame;
wherein the frame includes in inner portion configured to receive the mesh screen and an outer portion configured to engage a first surface of a container,
wherein the frame and mesh screen elevate objects a predetermined distance above a second surface of a container, further comprising at least one selectively adjustable wing, wherein the at least one selectively adjustable wing is secured to at least one of the frame and the mesh screen with a pin, wherein the pin includes a selectively rotational device, wherein the pin includes a selectively rotational device.

6. A platform comprising:
a frame;
a mesh screen disposed within the frame;
wherein the frame includes in inner portion configured to receive the mesh screen and an outer portion configured to engage a first surface of a container,
wherein the frame and mesh screen elevate objects a predetermined distance above a second surface of a container, further comprising at least one selectively adjustable wing, wherein the at least one selectively adjustable wing is secured to at least one of the frame and the mesh screen with a pin, wherein the at least one selectively adjustable wing includes a frictional element to selectively engage at least one surface of the container.

* * * * *